(12) United States Patent
Goshima et al.

(10) Patent No.: US 12,061,540 B2
(45) Date of Patent: Aug. 13, 2024

(54) PROCESSOR AND PROCESSING METHOD

(71) Applicants: Fujitsu Limited, Kawasaki (JP); Inter-University Research Institute Corporation Research Organization of Information and Systems, Tachikawa (JP)

(72) Inventors: Masahiro Goshima, Chiyoda (JP); Yi Ge, Bunkyo (JP)

(73) Assignees: Fujitsu Limited, Kawasaki (JP); Inter-University Research Institute Corporation Research Organization of Information and Systems, Tachikawa (JP)

( * ) Notice: Subject to any disclaimer, the term of this patent is extended or adjusted under 35 U.S.C. 154(b) by 0 days.

(21) Appl. No.: 18/113,180

(22) Filed: Feb. 23, 2023

(65) Prior Publication Data
US 2023/0289284 A1   Sep. 14, 2023

(30) Foreign Application Priority Data

Mar. 14, 2022 (JP) .................................. 2022-039071

(51) Int. Cl.
*G06F 12/02* (2006.01)
*G06F 12/0875* (2016.01)

(52) U.S. Cl.
CPC ........ *G06F 12/023* (2013.01); *G06F 12/0875* (2013.01); *G06F 2212/452* (2013.01)

(58) Field of Classification Search
CPC ............... G06F 12/023; G06F 12/0875; G06F 2212/452; G06F 13/1631; G06F 12/0855; G06F 9/30; G06F 2212/1048
See application file for complete search history.

(56) References Cited

U.S. PATENT DOCUMENTS

| | | | |
|---|---|---|---|
| 2002/0007449 A1 | 1/2002 | Koyanagi | |
| 2015/0277913 A1* | 10/2015 | Bradbury | G06F 9/30181 712/229 |
| 2015/0277920 A1* | 10/2015 | Bradbury | G06F 9/3851 712/215 |
| 2015/0277921 A1* | 10/2015 | Bradbury | G06F 9/30076 712/215 |
| 2018/0276035 A1* | 9/2018 | Henry | G06F 9/4812 |
| 2018/0276150 A1* | 9/2018 | Eckert | G06F 13/1642 |
| 2018/0307606 A1* | 10/2018 | Ray | G06T 1/60 |
| 2019/0004843 A1* | 1/2019 | Durham | G06F 21/53 |
| 2019/0114172 A1 | 4/2019 | Eyole et al. | |
| 2023/0393769 A1* | 12/2023 | Durham | G06F 12/0875 |

FOREIGN PATENT DOCUMENTS

| | | |
|---|---|---|
| JP | 2002-24205 A | 1/2002 |
| JP | 2019-517060 A | 6/2019 |
| JP | 2020-52862 A | 4/2020 |

* cited by examiner

*Primary Examiner* — Francisco A Grullon
(74) *Attorney, Agent, or Firm* — WHDA, LLP

(57) ABSTRACT

A processor includes a queue configured to hold a memory access instruction including one or more addresses, a contracted address generator configured to generate a contracted address by contracting bits of multiple addresses in a case where the memory access instruction includes the multiple addresses, a conflict detector configured to detect a conflict between the contracted address and the address held in the queue, and an access controller configured to control processes of the memory access instruction held in the queue, based on a detection result of the conflict detector.

10 Claims, 13 Drawing Sheets

FIG.3

GENERATION METHOD 1

```
MA1.AD0   1 0 1 1 0 0 1 1
MA1.AD1   1 0 1 0 0 1 1 1
MA1.AD2   1 0 1 0 1 0 1 0
MA1.AD3   1 0 1 1 0 0 1 0
MA1.AD4   1 0 1 1 1 0 1 0
MA1.AD5   1 0 1 0 0 1 1 0
MA1.AD6   1 0 1 1 0 1 1 0
MA1.AD7   1 0 1 0 1 1 1 1
```

⇨ MA1.CAD  1 0 1 X X X 1 X

GENERATION METHOD 2

```
MA1.AD0   1 0 1 1 0 0 1 1
MA1.AD1   1 0 1 0 0 1 1 1
MA1.AD2   1 0 1 0 1 0 1 0
MA1.AD3   1 0 1 1 0 0 1 0
MA1.AD4   1 0 1 1 1 0 1 0
MA1.AD5   1 0 1 0 0 1 1 0
MA1.AD6   1 0 1 1 0 1 1 0
MA1.AD7   1 0 1 0 1 1 1 1
```

⇨ MA1.CAD  1 0 1 X X X X X

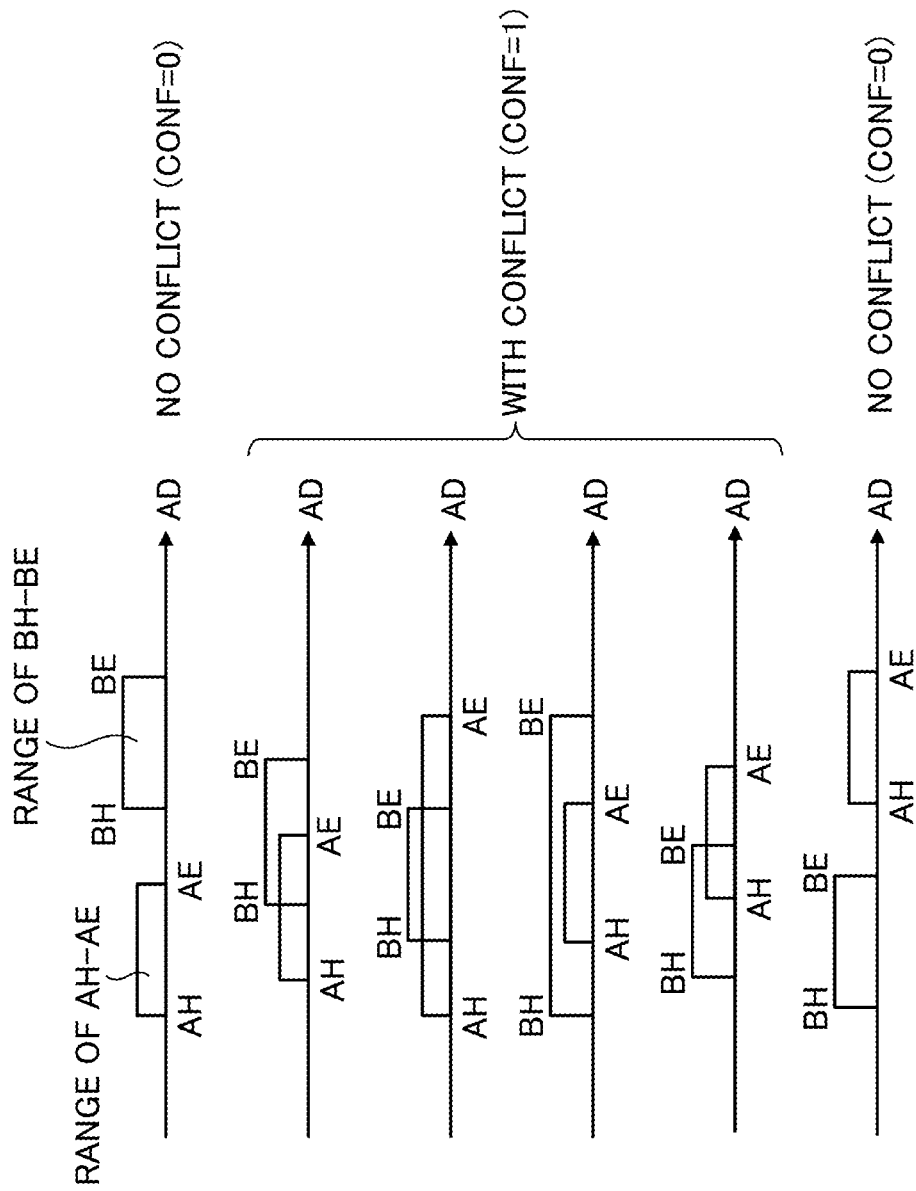

PROCESSOR AND PROCESSING METHOD

CROSS-REFERENCE TO RELATED APPLICATIONS

This application is based upon and claims the benefit of priority of the prior Japanese Patent Application No. 2022-039071, filed on Mar. 14, 2022, the entire contents of which are incorporated herein by reference.

FIELD

The embodiments discussed herein are related to processors and processing methods.

BACKGROUND

In a processor having a single instruction multiple data (SIMD) function unit, the processing performance is improved by executing operations on multiple data in parallel. For example, the multiple data subjected to the operations may be read in parallel from a memory using a vector load instruction. In other words, the processor having the SIMD function unit has an architecture for making efficient data transfer.

For example, in the processor of this type, there is known a technique for managing address conflicts by executing a check instruction that detects whether or not a memory address in an address hazard state is present, when executing a vector operation (for example, refer to Japanese National Publication of International Patent Application No. 2019-517060). In addition, there is known a technique for integrating requests by acquiring a number of address overlaps in a single line, and notifying an integrated value of address overlaps among multiple lines to a scalar operation unit, when executing a vector gather instruction (for example, refer to Japanese Laid-Open Patent Publication No. 2020-52862). In addition, there is known a technique for holding a subsequent memory access instruction, when an overlap between an address range of a vector scatter instruction with area designation and an address of the subsequent memory access instruction is detected (for example, refer to Japanese Laid-Open Patent Publication No. 2002-24205).

A processor that executes instructions out-of-order has a mechanism for committing instructions in-order. When committing a memory access instruction in-order, a load-store queue may be provided to hold an address included in the memory access instruction. Further, a conflict between the address held in the load-store queue and an address included in the subsequent or preceding memory access instruction is detected, and whether or not to commit the memory access instruction held in the load-store queue is detected based on a detection result of the conflict.

For example, when the memory access instruction is executed, the address of the memory access instruction is held in the load-store queue, and is compared with an address of another memory access instruction that is already held. In the case of a vector memory access instruction including multiple addresses, such as a gather instruction, a scatter instruction, or the like, each of the multiple addresses is held in the load-store queue and compared.

For this reason, in the processor capable of executing the vector memory access instruction, multiple comparators may be provided for comparing multiple addresses in parallel. When the multiple comparators are provided, a circuit scale of the processor increases considerably.

SUMMARY

Accordingly, it is one object in one aspect of the embodiments to reduce a circuit scale of a conflict detector that detects a conflict between an address included in a memory access instruction and an address held in a queue that holds the memory access instruction.

According to one aspect of the embodiments, a processor includes a queue configured to hold a memory access instruction including one or more addresses; a contracted address generator configured to generate a contracted address by contracting bits of multiple addresses in a case where the memory access instruction includes the multiple addresses; a conflict detector configured to detect a conflict between the contracted address and the address held in the queue; and an access controller configured to control processes of the memory access instruction held in the queue, based on a detection result of the conflict detector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram for explaining an example of a method of generating a contracted address by a contracted address generator in FIG. 1;

FIG. 13 is a diagram illustrating an example of an operation of the match detection circuit in FIG. 12.

DESCRIPTION OF EMBODIMENTS

Preferred embodiments of the present invention will be described with reference to the accompanying drawings.

Figure 1:
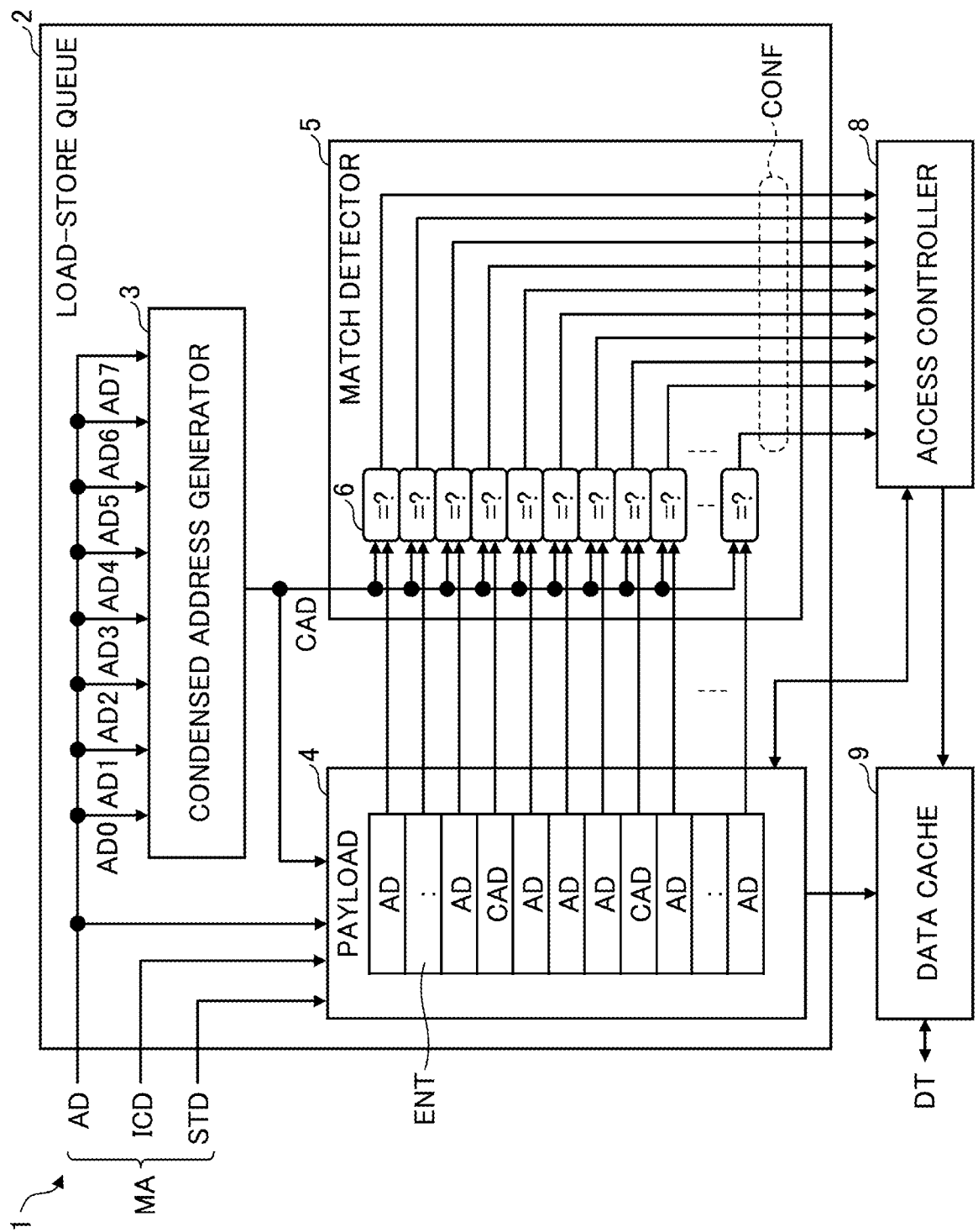
FIG. 1 is a block diagram illustrating an example of a part of a processor according to a first embodiment.

FIG. 1 illustrates an example of a processor according to a first embodiment. A processor 1 illustrated in FIG. 1 may be a central processing unit (CPU) or the like capable of executing a SIMD instruction, for example.

The processor 1 includes a load-store queue 2, an access controller 8, and a data cache 9. The load-store queue 2 includes a contracted (or reduced) address generator 3, a payload 4, and a match detector 5. FIG. 1 illustrates a part of elements used for a memory access. In actual practice, the processor 1 may include an instruction cache, an instruction decoder, a scheduler, such as a reservation station or the like, a register file, a function unit including a computing element capable of executing a SIMD instruction, or the like that are not illustrated.

The processor 1 including the scheduler, such as the reservation station or the like, may execute instructions in an order different from an order of instructions decoded by the instruction decoder (that is, an order of instructions described in a program). For this reason, in order to guarantee committing of a load instruction and a store instruction in-order, the load-store queue 2 is provided to detect an address conflict. The address conflict will be described with reference to FIG. 2. The load instruction and the store instruction include a single address or multiple addresses.

In a case where multiple addresses AD (AD0 through AD7) are included in a memory access instruction MA such of the load instruction or the store instruction, the contracted address generator 3 contracts (or reduces) the multiple addresses AD to generate a contracted (or reduced) address CAD. For example, the contracted address generator 3 contracts the multiple addresses included in a vector load instruction or a vector store instruction, based on the vector load instruction or the vector store instruction issued from the scheduler.

Examples of the vector load instruction and the vector store instruction include a contiguous address vector load instruction and a contiguous address vector store instruction in which the addresses are contiguous in an ascending order or a descending order, and a stride vector load instruction and a stride vector store instruction in which the addresses are equally spaced, for example. In addition, the vector load instruction may be a gather instruction that designates arbitrary multiple addresses. The vector store instruction may be a scatter instruction that designates arbitrary multiple addresses.

Although FIG. 1 illustrates an example where eight addresses AD0 through AD7 are contracted, the contracted address generator 3 can contract two or more addresses AD, and output a single address AD as the contracted address AD. For example, in a case where the contracted address generator 3 receives the single address AD in response to the memory access instruction MA, the contracted address generator 3 may output the single address AD as the contracted address CAD. In this case, a path for transferring the address AD to the payload 4 may be omitted.

Figure 2:
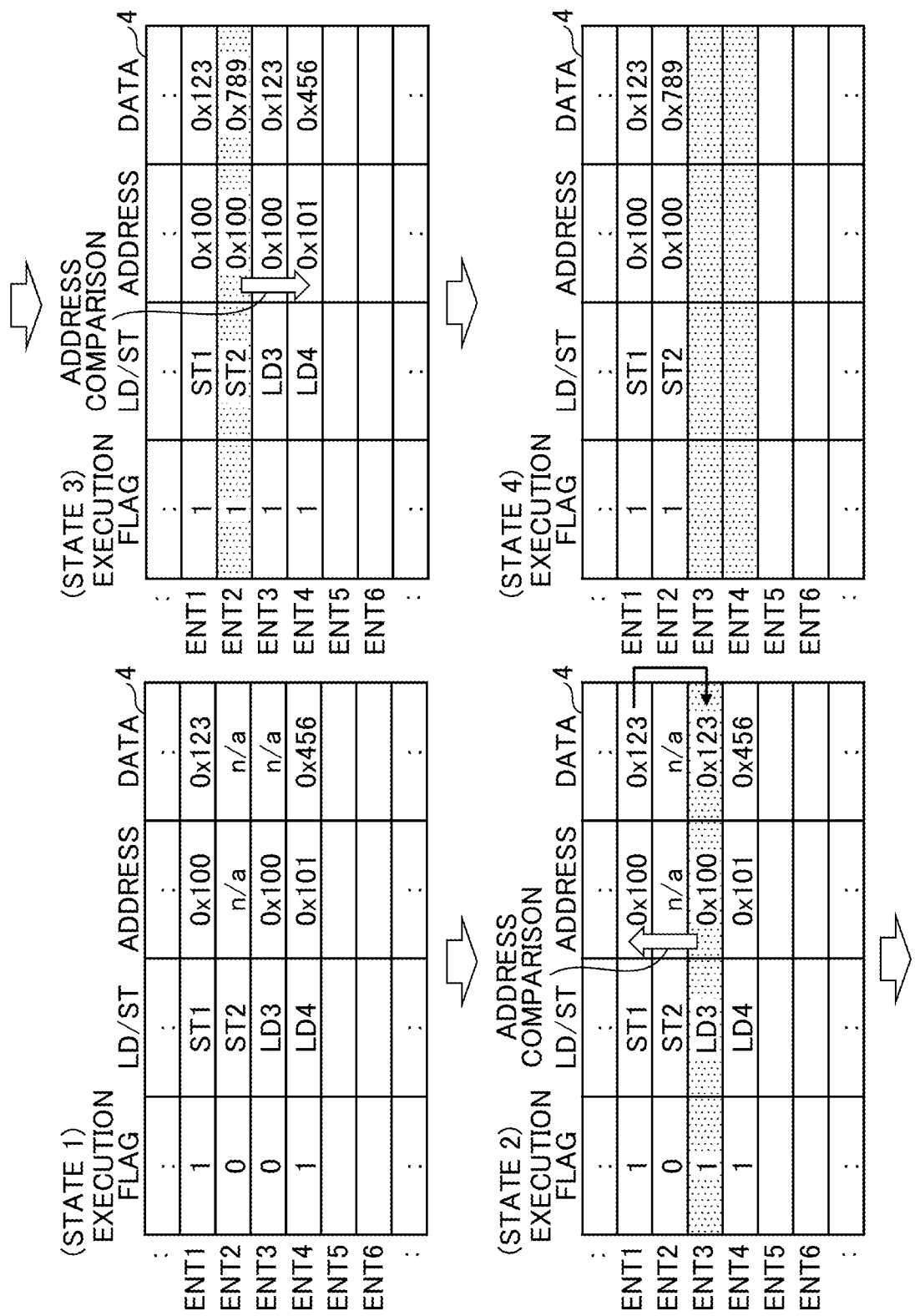
FIG. 2 is a diagram for explaining an example of a change in a payload state in FIG. 1.

The payload 4 includes multiple entries ENT for holding the memory access instruction MA. The payload 4 is an example of a queue. For example, an execution flag, an instruction code indicating the load instruction or the store instruction, an address, and data are held in the entries ENT as the memory access instruction MA. The data held in the entries ENT is a store data included in the memory access instruction MA or a load data read from the data cache 9. Only an address area of each entry ENT is illustrated in FIG. 1 for the sake of convenience, in order to simplify the illustration of this figure. An example of the payload 4 is illustrated in FIG. 2.

The payload 4 outputs the address (AD or CAD) held in each entry ENT to the match detector 5. In addition, the payload 4 outputs the memory access instruction MA held in the entry ENT designated by the access controller 8 to the data cache 9. The payload 4 holds the memory access instruction MA transferred from the scheduler and the register file that are not illustrated, and the contracted address CAD output from the contracted address generator 3.

By storing the contracted address CAD generated by the contracted address generator 3 in the payload 4, it is possible to increase the number of memory access instructions MA storable in the payload 4, compared to a case where the multiple addresses AD before being contracted are stored in the payload 4. As a result, it is possible to increase the number of memory access instructions MA whose processes are controllable by the access controller 8, and to improve a processing performance of the processor 1. In addition, in a case where the processing performance of the processor 1 is unchanged, it is possible to reduce the number of entries ENT of the payload 4, and to reduce a circuit scale of the processor 1.

The match detector 5 includes multiple match detection circuits 6 respectively corresponding to the multiple entries ENT of the payload 4. Each match detection circuit 6 compares the address (AD or CAD) from the payload 4 with the contracted address CAD generated by the contracted address generator 3, and outputs a conflict signal CONF when an address conflict is detected. The match detector 5 is an example of a conflict detector that detects a conflict between the contracted address CAD and the address held in the payload 4.

The access controller 8 controls the processes of the memory access instruction MA held in the payload 4. For example, the access controller 8 controls an access to the data cache 9, based on the memory access instruction MA held in the payload 4. Further, the access controller 8 controls a commit process of the memory access instruction MA held in the payload 4, based on the conflict signal CONF output from the match detector 5.

The data cache 9 reads a read target data DT from a data array in the data cache 9 and outputs the read target data DT to the register file, based on reception of a read request corresponding to the load instruction. The data cache 9 updates the data held in the data array with a write target data, based on reception of a write request corresponding to the store instruction. In a case where an access target data is not held in the data array (cache miss), the data cache 9 reads the data from a memory, such as a lower-level cache, or a main memory.

FIG. 1 illustrates an example where the load-store queue 2 operates in common for the load instruction and the store instruction. However, the load-store queue 2 may operate in correspondence with each of the load instruction and the store instruction, for example. In this case, the payload 4 includes multiple of entries ENT where the load instruction is stored, and multiple entries ENT where the store instruction is stored.

In a case where the contracted address generator 3 receives the multiple addresses AD included in the load instruction, the contracted address generator 3 detects the conflict by comparing the generated contracted address CAD with the multiple addresses held in the entries ENT for the store instruction. In a case where the contracted address generator 3 receives the multiple addresses AD included in the store instruction, the contracted address generator 3 detects the conflict by comparing the generated contracted address CAD with the multiple addresses held in the entries ENT for the load instruction.

FIG. 2 illustrates an example of a change in a state of the payload 4 illustrated in FIG. 1. FIG. 2 illustrates an example where two store instructions ST (ST1, ST2) and two load instructions LD (LD3, LD4) are stored in entries ENT1, ENT2, ENT3, and ENT4 of the payload 4, respectively. For example, the payload 4 functions as a ring buffer, and the number of the entries ENT indicates the order of the instructions described in the program.

The execution flag "0" indicates that the instruction has not been executed. The execution flag "1" indicates that the instruction has been executed. "0x" added before a numerical value illustrated in the address and data columns indicates that the numerical value is a hexadecimal number. A symbol "n/a" illustrated in the address and data columns indicates that the address or data is undetermined. An entry ENT in halftone indicates that the state has changed. For example, the control of the payload 4 is executed by the access controller 8 illustrated in FIG. 1.

For the sake of convenience and simplicity, FIG. 2 illustrates an example where a scalar store instruction ST and a scalar load instruction LD including a single address, respectively, are stored in the payload 4. However, a vector store instruction ST and a vector load instruction LD including multiple addresses, respectively, may be stored in the payload 4. In the case where the vector store instruction ST and the vector load instruction LD are stored in the payload 4, the contracted address CAD is stored in the entries ENT. In addition, in the case where the vector store instruction ST is stored in the payload 4, multiple data corresponding to the multiple addresses, respectively, are stored at the multiple addresses.

In a state 1, the store instruction ST1 and the load instruction LD4 are executed, and the store instruction ST2 and the load instruction LD3 are not executed. Because the address of the store instruction ST2 is undetermined, a data "0x456" acquired by the load instruction LD4 subsequent to the store instruction ST2 may not be correct.

Next, in a state 2, the load instruction LD3 is executed. The address included in the load instruction LD3 is output from the contracted address generator 62 as the contracted address CAD. The match detector 5 compares the address of the load instruction LD3 with the addresses of all instructions stored in the payload 4, regardless of the type of the instruction.

The access controller 8 refers to comparison results of the address of the load instruction LD3, and the addresses of the store instructions ST1 and ST2 preceding the load instruction LD3 and stored in the payload 4, among the comparison results of the match detector 5. Further, the access controller 8 detects a conflict between the address of the load instruction LD3 and the address of the store instruction ST1. For this reason, the access controller 8 determines not to read a read target data of the load instruction LD3 from the cache 9 but to forward the data from the entry ENT1, and stores the data "0x123" held in the entry ENT1 in the entry ENT3.

Next, in a state 3, after the address of the store instruction ST2 is stored in the entry ENT2 by the contracted address generator 3, the store instruction ST2 is executed. In addition, the address "0x100" and the data "0x789" of the store instruction ST2 are stored in the entry ENT2. The address included in the store instruction ST2 is output from the contracted address generator 62 as the contracted address CAD.

The match detector 5 compares the address of the store instruction ST2 with the addresses of all instructions stored in the payload 4, regardless of the type of the instruction. The access controller 8 refers to comparison results of the address of the store instruction ST2 and the addresses of the load instructions LD3 and LD4 subsequent to the store instruction ST2 and stored in the payload 4, among the comparison results of the match detector 5. Further, the access controller 8 detects a conflict between the address of the store instruction ST2 and the address of the load instruction LD3.

In a state 4, the access controller 8 cancels execution of the load instructions LD3 and LD4 subsequent to the store instruction ST2, and removes the load instructions LD3 and LD4 from the entries ENT3 and ENT4. Accordingly, it is possible to cancel the data "0x123" of the load instruction LD3 erroneously forwarded from the entry ENT1 in the state 2. The cancelled load instructions LD3 and LD4 are thereafter reissued.

In this embodiment, because the match detector 5 compares the contracted address CAD generated by the contracted address generator 3 with the address held in the payload 4, it is possible to reduce the number of match detection circuits 6, compared to the case where the multiple addresses before the contracting are used for the comparison. For this reason, it is possible to reduce a circuit scale of the match detector 5, compared to the case where the multiple addresses before the contracting are used for the comparison.

Moreover, because the contracted address CAD is stored in the payload 4, it is possible to improve a utilization efficiency of the entries ENT, and to increase the number of memory access instructions MA storable in the payload 4, compared to the case where the multiple addresses before contracting are stored in the payload 4. Accordingly, it is possible to increase the number of memory access instructions MA whose processes are controllable by the access controller 8, and to improve the processing performance of the processor 1.

Further, in a case where the utilization efficiency of the entries ENT does not need to be improved, it is possible to reduce the number of entries ENT. As a result, it is possible to further reduce the number of match detection circuits 6, and to further reduce the circuit scale of the match detector 5.

FIG. 3 illustrates an example of a method of generating the contracted address by the contracted address generator 3 illustrated in FIG. 1. FIG. 3 illustrates an example where a memory access instruction MA1 is a gather instruction or a scatter instruction including eight addresses AD0 through AD7. For the sake of convenience and simplicity, FIG. 3 illustrates an example where each of the addresses AD0 through AD7 has 8 bits, but the number of bits of each of the addresses AD0 through AD7 is not limited to 8 bits. The addresses AD0 through AD7 described in figures subsequent to FIG. 3 are also not limited to 8 bits.

According to a generation method 1, the contracted address generator 3 sets a bit value of the contracted address CAD to "0" when all bit values are "0" at each of the bit positions of the addresses AD0 through AD7, and sets the bit value of the contracted address CAD to "1" when all bit values are "1" at each of the bit positions of the addresses AD0 through AD7. In addition, the contracted address generator 3 sets the bit value of the contracted address CAD to an indefinite value "X" when the bit values "0" and "1" coexist at each of the bit positions of the addresses AD0 through AD7. According to a generation method 2, the contracted address generator 3 sets the bits lower than the bit position indicating the indefinite value "X" in the contracted address CAD to the indefinite value "X", in addition to following the rules of the generation method 1.

As described above, the contracted address generator 3 can generate the contracted address CAD represented by a ternary logic of "0", "1", and "X", using the generation method 1 or the generation method 2. When the memory access instruction MA1 includes a single address AD, the contracted address generator 3 sets the single address AD as the contracted address CAD.

Accordingly, regardless of whether the memory access instruction MA includes the single address AD or multiple addresses AD, the contracted address CAD generated by the contracted address generator 3 can be stored in the payload 4. Accordingly, it is possible to easily control storing of the addresses AD and CAD in the payload 4, compared to the case where the storing method to the payload 4 differs depending on whether the address is the single address AD or the contracted address CAD.

Figure 8:
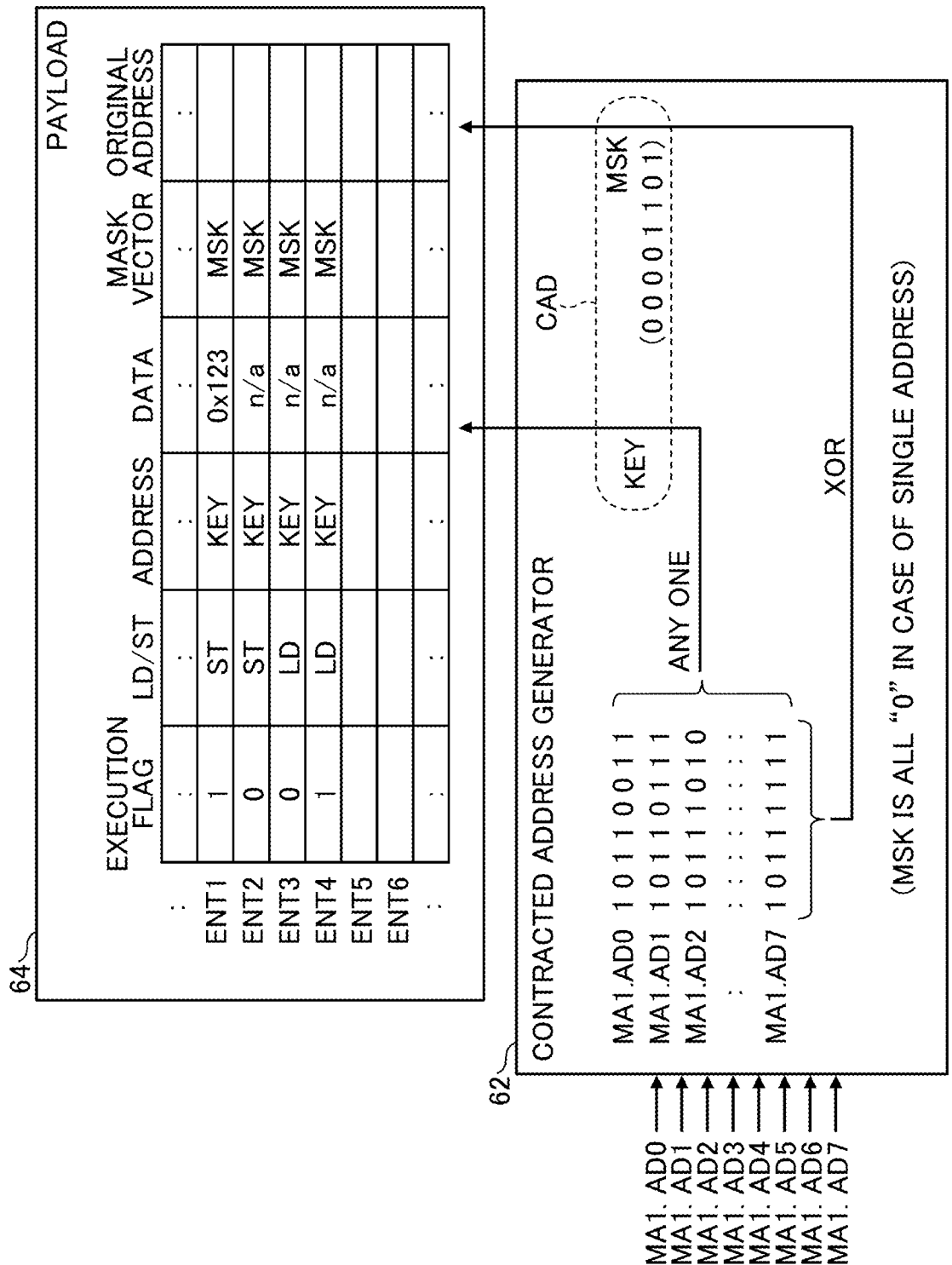
FIG. 8 is a diagram for explaining an example of a payload and an example of the method of generating the contracted address by the contracted address generator in FIG. 7.

However, because the processor 1 processes binary numbers, and cannot use the indefinite value "X". For this reason, in actual practice, as illustrated in FIG. 8, the contracted address generator 3 converts the contracted address CAD represented by the ternary logic into a format that can be represented by a binary number. The contracted address generator 3 may set the indefinite value "X" to a value "00", the value "$_0$" to a value "01", and the value "1" to a value "10" in the contracted address CAD, for example.

Figure 4:
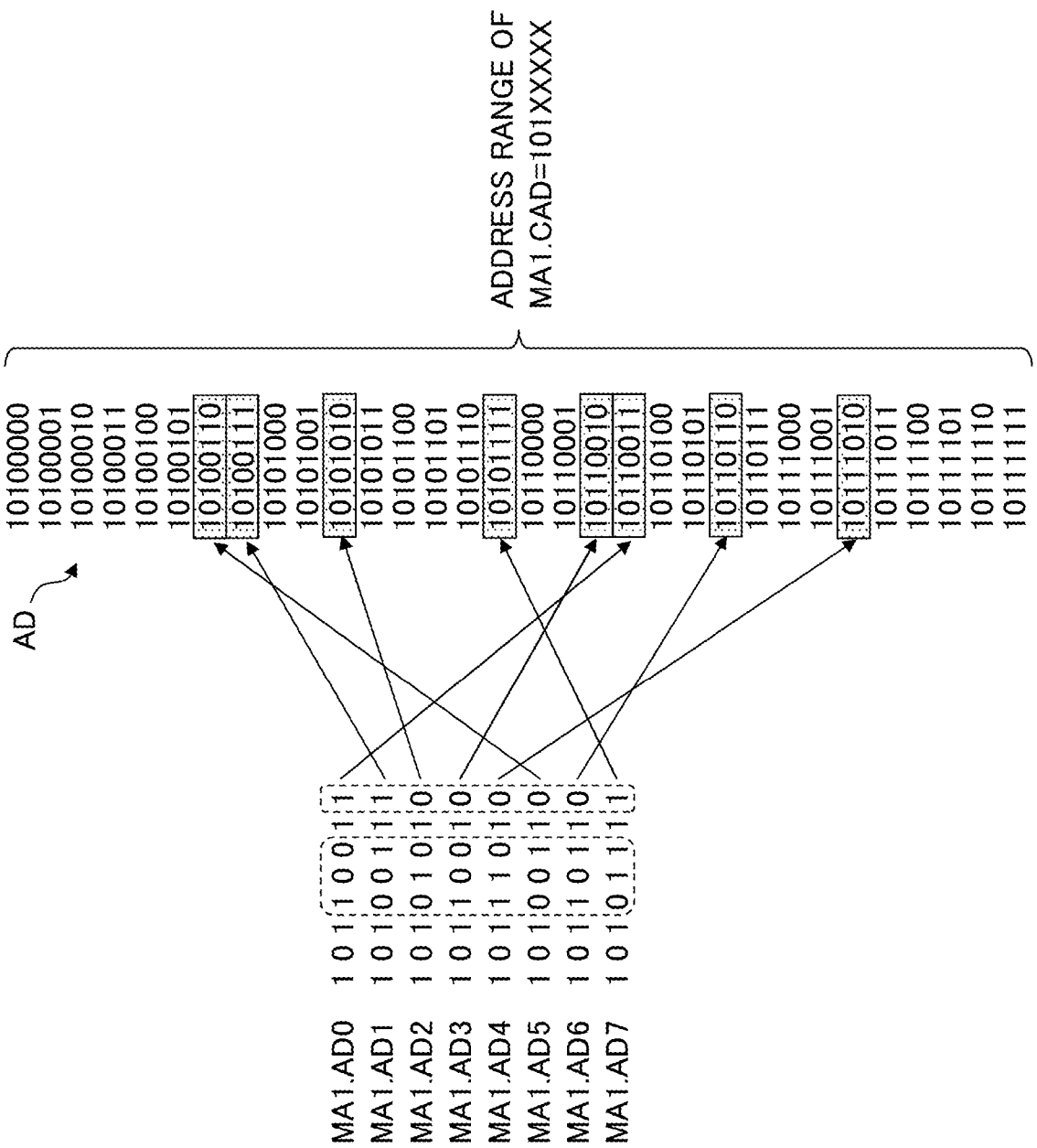
FIG. 4 is a diagram for explaining an example of an address range indicated by the contracted address in FIG. 3.

FIG. 4 illustrates an example of an address range indicated by the contracted address CAD illustrated in FIG. 3. The eight addresses AD0 through AD7 included in the memory access instruction MA1 illustrated in FIG. 4 as an example, are the same as the addresses AD0 through AD7 illustrated in FIG. 3. In addition, a contracted address MA1.CAD illustrated in FIG. 4 is the same as a contracted address MA1.CAD in the generation method 2 illustrated in FIG. 3. In a case where the contracted address CAD is generated by the generation method 2 illustrated in FIG. 3, the match detector 5 detects that the address AD in a range of "10100000" to "10111111" illustrated in FIG. 4 collides with the contracted address MA1.CAD.

In a case where the contracted address CAD is generated by the generation method 1 illustrated in FIG. 3, the match detector 5 detects that the address AD of "10110001" in which a second bit from a least significant bit of the address MA1.AD0 is "0" does not collide with the contracted address MA1.CAD, for example. For this reason, according to the generation method 1, it is possible to reduce the number of addresses AD included in the contracted address CAD, and to improve an accuracy of detecting the conflict, compared to the generation method 2.

Figure 5:
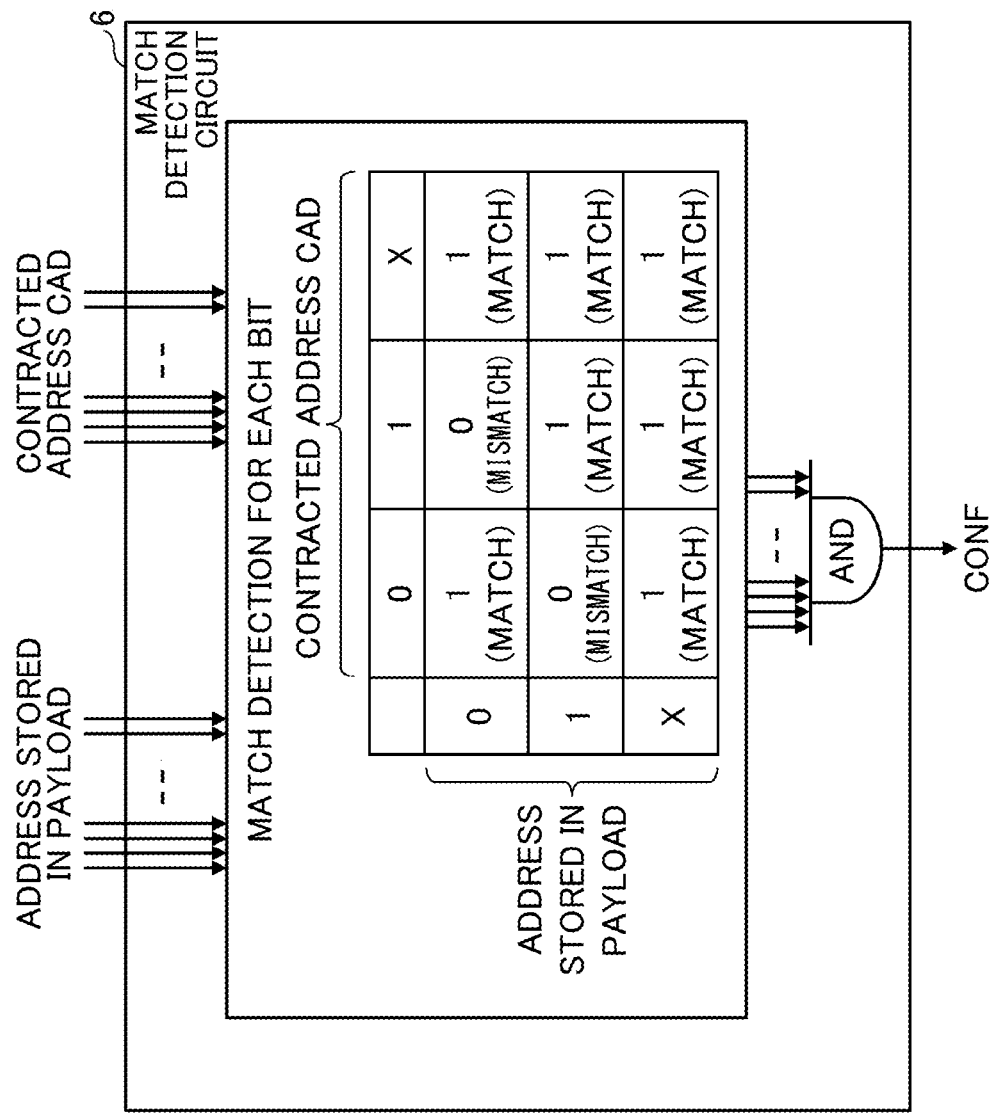
FIG. 5 is a diagram for explaining an example of an address detection operation by each match detection circuit of a match detector in FIG. 1.

FIG. 5 illustrates an example of an address detection operation by each match detection circuit 6 of the match detector 5 illustrated in FIG. 1. As illustrated in FIG. 1, the match detection circuit 6 compares each bit of the contracted address CAD generated by the contracted address generator 3 with each bit of the address held in one of the entries ENT of the payload 4. The address held in one of the entries ENT of the payload 4 is the single address AD or the contracted address CAD.

For example, in a case where the compared bit values are "0" and "1", or "1" and "0", the match detection circuit 6 outputs "0" indicating a mismatch to an AND-circuit AND. In a case where the compared bit values are "0"s, or "1"s, or at least one of the compared bit values has the indefinite value "X", the match detection circuit 6 outputs "1" indicating a match to the AND-circuit AND.

In a case where the bit values of the comparison result are all "1" (all match), the AND-circuit AND sets the conflict signal CONF to "1" indicating the address conflict. In a case where one of the bit values of the comparison result is "0" (mismatch), the AND-circuit AND sets the conflict signal CONF to "0" indicating no address conflict. The access controller 8 illustrated in FIG. 1 detects the conflict between the contracted address CAD generated by the contracted address generator 3 and the address held in the payload 4, based on the logical value of the conflict signal CONF output from each match detection circuit 6. Further, the access controller 8 determines whether or not to commit the memory access instruction MA, and controls the processes of the memory access instruction MA held in the queue, based on the detection result of the conflict.

Figure 6:
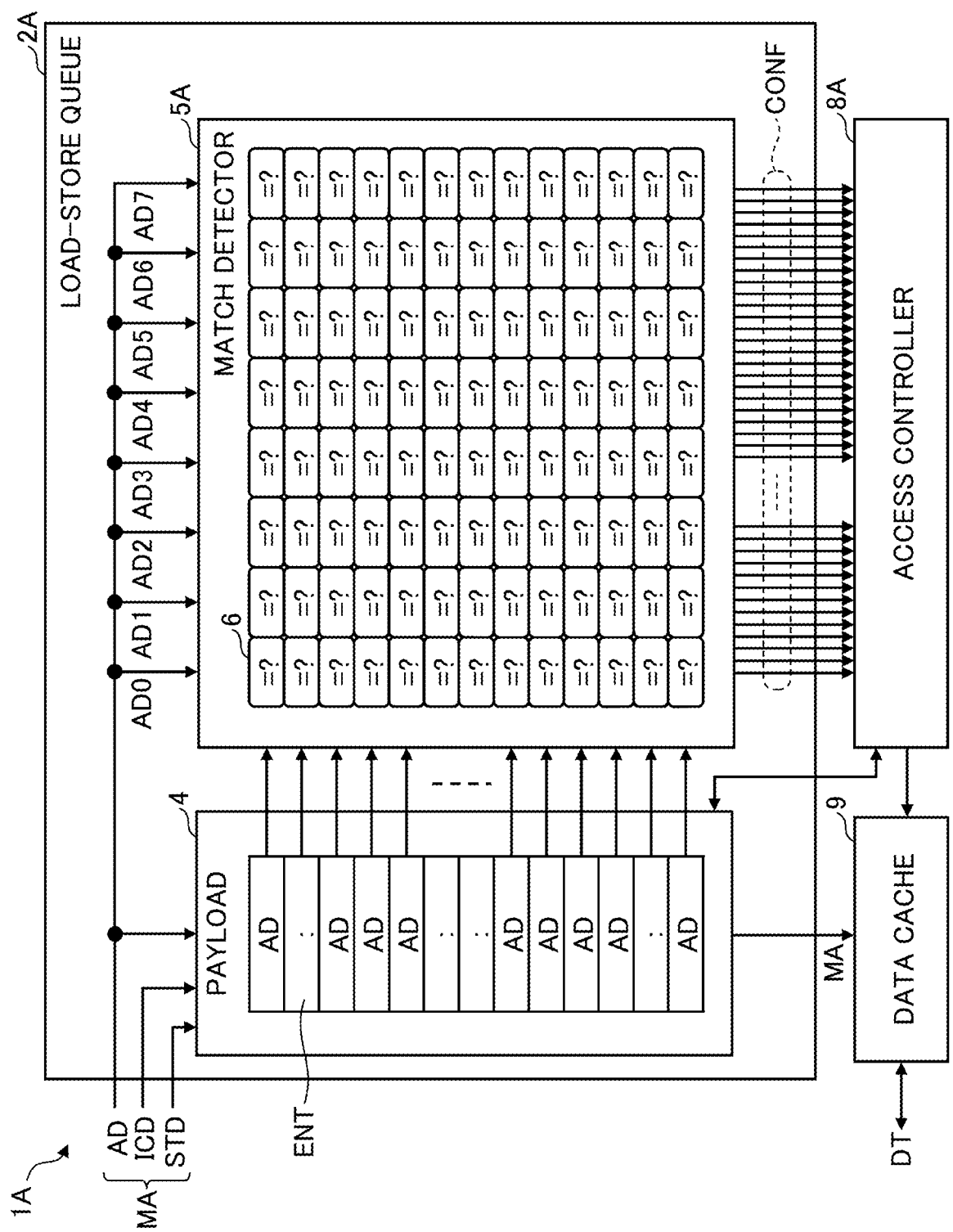
FIG. 6 is a block diagram illustrating an example of another processor.

FIG. 6 illustrates an example of another processor. A processor 1A illustrated in FIG. 6 does not include the contracted address generator 3 illustrated in FIG. 1, and includes a load-store queue 2A, a match detector 5A and an access controller 8A in place of the load-store queue 2, the match detector 5 and the access controller 8 illustrated in FIG. 1.

In a case where the processor 1A does not include the contracted address generator 3, the match detector 5A directly receives the multiple addresses AD0 through AD7 included in the vector load instruction LD or the vector store instruction ST. Further, the match detector 5A compares the received addresses AD0 through AD7 with the addresses AD held in each of the entries ENT of the payload 4. For this reason, the match detector 5A includes a number of match detection circuits 6 corresponding to a product of the number of addresses AD0 through AD7 and the number of entries ENT.

The access controller 8A receives the conflict signals CONF output from all of the match detection circuits 6, and controls the commit process of the memory access instruction MA held in the payload 4, based on the received conflict signals CONF. As illustrated in FIG. 6, a circuit scale of the match detector 5A and the access controller SA of the processor 1A that does not include the contracted address generator 3, is larger than the circuit scale of the match detector 5 and the access controller 8 of the processor 1 illustrated in FIG. 1.

For example, the circuit scale of the contracted address generator 3 illustrated in FIG. 1 corresponds to approximately two match detection circuits 6 for each address AD. For this reason, a decrease in the circuit scale of the match detector 5 and the access controller 8 illustrated in FIG. 1 is sufficiently large compared to an increase in the circuit scale of the contracted address generator 3.

As described above, in this embodiment, the match detector 5 compares the contracted address CAD generated by the contracted address generator 3 with the address held in the payload 4. Hence, it is possible to reduce the number of match detection circuits 6, and to reduce the circuit scale of the match detector 5, compared to the case where the multiple addresses AD0 through AD7 before the contracting are used for the comparison.

Because the contracted address CAD is stored in the payload 4, it is possible to improve the utilization efficiency of the entries ENT, and to increase the number of memory access instructions MA storable in the payload 4, compared to the case where the multiple addresses before the contracting are stored in the payload 4. Thus, it is possible to increase the number of memory access instructions MA whose processes are controllable by the access controller 8, and to improve the processing performance of the processor 1.

Because the contracted address generator 3 can also output the single address AD as the contracted address CAD, the contracted address CAD generated by the contracted address generator 3 can be stored in the payload 4, regardless of whether the memory access instruction MA includes the single address AD or multiple addresses AD. Accordingly, it is possible to easily control the storing of the addresses AD and CAD in the payload 4.

Figure 7:
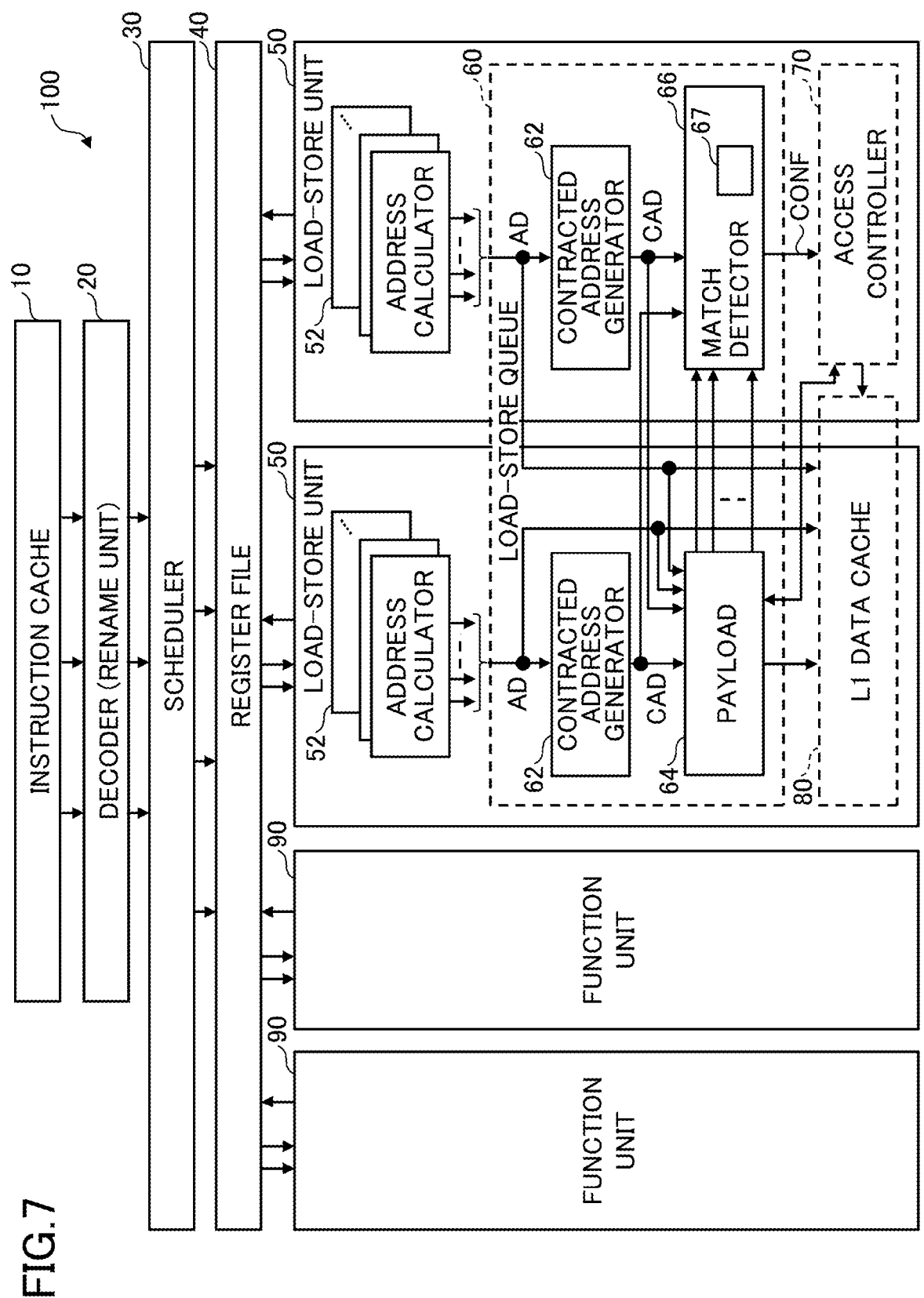
FIG. 7 is a block diagram illustrating an example of the processor according to a second embodiment.

FIG. 7 illustrates an example of the processor according to a second embodiment. A detailed description of elements illustrated in FIG. 7 that are similar to the elements illustrated in FIG. 1 through FIG. 6 will be omitted. A processor 100 illustrated in FIG. 7 may be a CPU or the like capable of executing a SIMD instruction, similar to the processor 1 illustrated in FIG. 1.

The processor 100 includes an instruction cache 10, a decoder 20, a scheduler 30, such as a reservation station or the like, a register file 40, multiple load-store (LDST) units 50, and multiple function units 90.

The instruction cache 10 holds an instruction transferred from a memory, such as a main memory or the like, and outputs the held instruction to the decoder 20. For example, instruction cache 10 may be a level-1 (L1) instruction cache. The instructions held in the instruction cache 10 are function instructions and memory access instructions.

The function instruction includes an integer function instruction, a fixed-point function instruction, a floating-point function instruction, or the like, for example. The memory access instruction includes a load instruction, a store instruction, or the like, for example. In addition, at least one of the integer function instruction, the fixed-point function instruction, and the floating-point function instruction may include a SIMD function instruction. Moreover, similar to the processor 1 illustrated in FIG. 1, the load instruction includes the scalar load instruction including the single address, and also the contiguous address load instruction LD and the gather instruction, as the vector load instruction LD. The store instruction includes the scalar store instruction including the single address, and also the contiguous address store instruction ST and the scatter instruction, as the vector store instruction ST.

The decoder 20 decodes instructions received in-order from the instruction cache 10, and outputs the decoded instructions to the scheduler 30. The processor 100 may include an instruction buffer, that is provided between the instruction cache 10 and the decoder 20, and accumulates the multiple instructions transferred from the instruction cache 10.

Logical register numbers included in the instructions decoded by the decoder 20 may be converted into physical register numbers identifying physical registers in the register file 40, by a rename unit, for example. The logical register number is a register number described in the program. By providing the rename unit, the processor 100 can provide, in the register file 40, a number of physical registers greater than the number of registers that can be described in the program. As a result, it is possible to reduce a register conflict frequency, and to improve an instruction execution efficiency, compared to the case where the rename unit is not provided.

The scheduler 30 includes an operation queue including multiple entries for holding function instructions output from the decoder 20, and a memory access queue including multiple entries for holding memory access instructions output from the decoder 20. The scheduler 30 issues, out-of-order, the function instructions held in the operation queue to one of the function units 90 in an executable order. In addition, the scheduler 30 outputs, out-of-order, the instructions held in the memory access queue to one of the load-store units 50 in an executable order.

Each of the multiple load-store units 50 executes the load instruction and the store instruction. Each of the multiple load-store units 50 includes multiple address calculators 52. The multiple load-store units 50 include a load-store queue 60, an access controller 70, and a L1 (Level 1) data cache 80 that are provided in common to the multiple load-store units 50. The load-store queue 60 includes a contracted address generator 62 corresponding to each of the multiple load-store units 50, and a payload 64 and a match detector 66 that are provided in common to the multiple load-store units 50. The match detector 66 includes multiple match detection circuits 67.

Each of the multiple address calculators 52 calculates an access target address of the memory access instruction, by executing an add process or the like on the data transferred from the register file 40. Each of the multiple address calculators 52 outputs the address obtained by the calculation to the corresponding contracted address generator 62 and payload 64. In addition, in the case of the load instruction, each of the multiple address calculators 52 outputs the address AD to the L1 data cache 80. By providing the multiple address calculators 52 in each load-store unit 50, it is possible to calculate in parallel the multiple addresses included in the vector load instruction or the vector store instruction.

Similar to the contracted address generator 3 illustrated in FIG. 1, the contracted address generator 62 contracts the multiple addresses AD included in the load instruction or the store instruction, and generates the contracted address CAD. An example of the method of generating the contracted address CAD is illustrated in FIG. 8. Similar to the payload 4 illustrated in FIG. 1, the payload 64 includes multiple entries ENT (not illustrated) for holding the memory access instruction. The payload 64 is an example of a queue. An example of the payload 64 is illustrated in FIG. 8.

Similar to the match detector 5 illustrated in FIG. 1, the match detector 66 includes multiple match detection circuits 67 respectively corresponding to the entries of the payload 64. Each match detection circuit 67 compares the address from the payload 64 with the contracted address CAD generated by the contracted address generator 62, and outputs the conflict signal CONF according to the comparison result. The match detector 66 is an example of the conflict detector that detects the conflict between the contracted address CAD and the address held in the payload 4. The match detection circuit 67 is an example of a conflict detection circuit.

Similar to the access controller 8 illustrated in FIG. 1, the access controller 70 controls the processes of the memory access instruction held in the payload 64, based on the conflict signal CONF, and controls the access to the L1 data cache 80. The L1 data cache 80 has the same configuration and function as the data cache 9 illustrated in FIG. 1.

Each of the function units 90 executes a function instruction. For example, each of the function units 90 includes a fixed-point function unit, a floating-point function unit, and a logic function unit.

FIG. 8 illustrates an example of the payload 64 illustrated in FIG. 7, and an example of the method of generating the contracted address by the contracted address generator 62. The payload 64 includes multiple entries ENT (ENT1 through ENT6 or the like) for holding the memory access instruction MA. For example, each entry ENT holds an execution flag, an instruction type (the load instruction LD or the store instruction ST), a key address KEY, data, a mask vector MSK, and an original address. The original address is the address calculated by each address calculator 52 before the addresses are contracted. In this embodiment, the contracted address CAD is expressed as by key address KEY and the mask vector MSK.

Similar to the contracted address generator 3 illustrated in FIG. 1, the contracted address generator 62 generates the contracted address CAD represented by the ternary logic of "0", "1", and "X". However, the contracted address generator 62 expresses the contracted address CAD by the key address KEY and the mask vector MSK, in order to detect the address conflict by the binary number handled in the processor 100.

By converting the contracted address CAD represented by the ternary logic into a format that can be represented by the binary number, the match detector 66 can detect the conflict of the contracted address CAD including the indefinite value "X", in the processor 100 that handles the binary number. In other words, it is possible to detect the conflict of the contracted address CAD including the indefinite value "X", without having to modify the architecture of the processor 100.

The contracted address generator 62 selects one of the multiple addresses AD included in the memory access instruction MA, as the key address KEY. In addition, the contracted address generator 62 calculates an exclusive-OR XOR of bit values at respective bit positions of the multiple addresses AD included in the memory access instruction MA, as the mask vector MSK. FIG. 8 illustrates an example where the mask vector MSK is calculated from the eight addresses AD0 through AD7 included in the memory access instruction MA1. The contracted address CAD (KEY, MSK) generated by the contracted address generator 62 is used for detection made by the match detector 66, and is stored in the payload 64 together with information of the memory access instruction MA.

Figure 9:
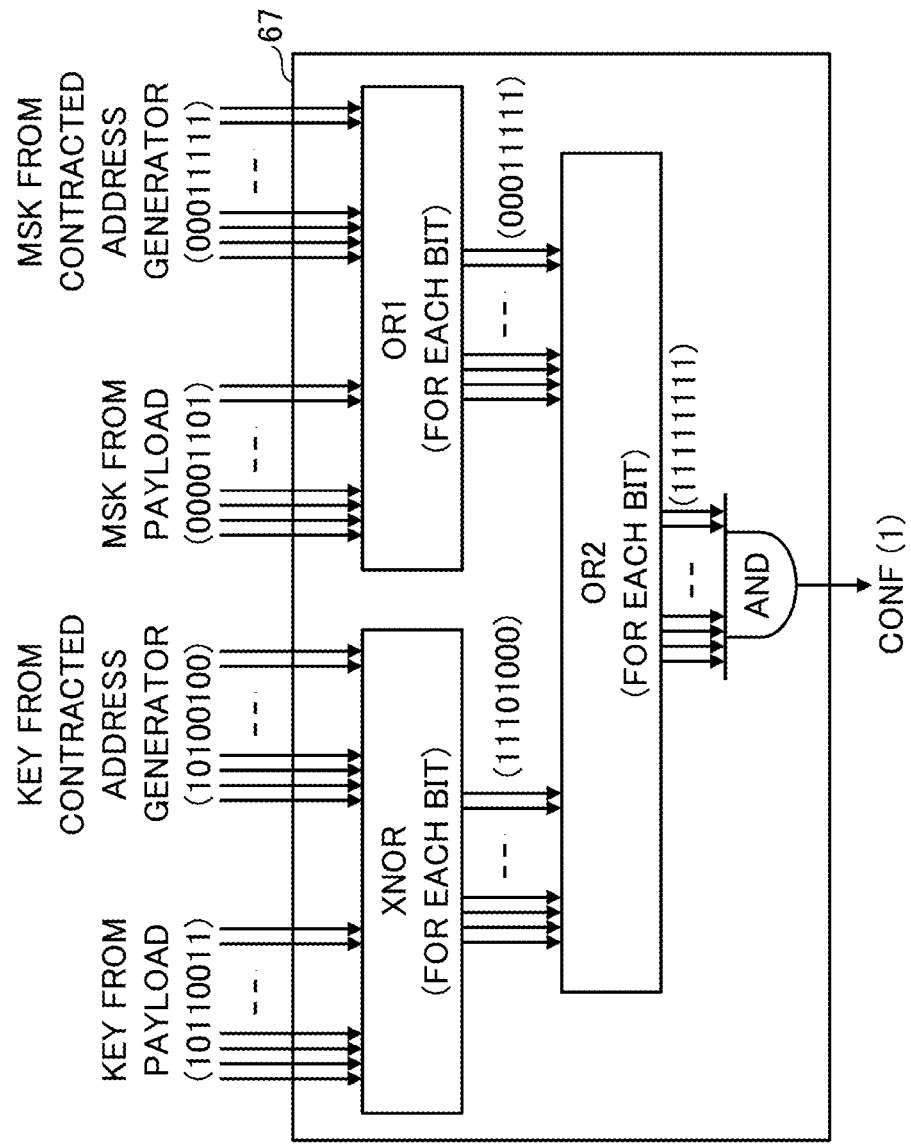
FIG. 9 is a circuit diagram illustrating an example of a match detection circuit in FIG. 7.

FIG. 9 illustrates an example of the match detection circuit 67 illustrated in FIG. 7. The match detection circuit 67 includes an exclusive-NOR circuit XNOR, OR-circuits OR1 and OR2, and an AND-circuit AND. The OR-circuit OR1 is an example of a first OR-circuit, and the OR-circuit OR2 is an example of a second OR-circuit. The AND-circuit AND is an example of a logical product circuit (or AND-circuit).

The exclusive-NOR circuit XNOR calculates an exclusive-NOR of the bits of the key address KEY held in one of the entries ENT of the payload 64, and the bits of the key address KEY generated by the contracted address generator 62. The OR-circuit OR1 calculates a logical sum of the bits of the mask vector MSK held in one of the entries ENT of the payload 64, and the bits of the mask vector MSK generated by the contracted address generator 62.

The OR-circuit OR2 calculates a logical sum of the bits of an output of the exclusive-NOR circuit XNOR, and the bits of an output of the OR-circuit OR1. The AND-circuit AND calculates a logical product of all bits of an output of the OR-circuit OR2, and outputs a calculation result as the conflict signal CONF.

When the match detection circuit 67 receives the key addresses KEY and the mask vectors MSK illustrated in parentheses in FIG. 9 from the payload 64 and the contracted address generator 62, respectively, the match detection circuit 67 outputs the conflict signal CONF (="1") indicating the address conflict. Hence, the match detection circuit 67 can detect the address conflict even in the case where the contracted address CAD is expressed by the key address KEY and the mask vector MSK. That is, the match detection circuit 67 can detect the conflict of the contracted addresses CAD represented by the ternary logic.

As described above, this embodiment can also obtain effects similar to the effects obtainable by embodiment described above. For example, because the match detector 66 compares the contracted address CAD with the address held in the payload 64, it is possible to reduce the number of match detection circuits 67, and to reduce the circuit scale of the match detector 66, compared to the case where the multiple addresses AD before the contracting are used for the comparison. In addition, by storing the contracted address CAD in the payload 64, it is possible to store a large number of more memory access instructions MA in the payload 64, and to improve the processing performance of the processor 100, compared to the case where the multiple addresses AD before the contracting are stored in the payload 64.

Further, in this embodiment, by converting the contracted address CAD represented by the ternary logic into the format that can be represented by the binary number, the match detector 66 can detect the conflict of the contracted address CAD including the indefinite value "X" in the processor 100 that handles the binary number. In other words, it is possible to detect the conflict of the contracted addresses CAD including the indefinite value "X", without having to modify the architecture of the processor 100. The match detection circuit 67 can detect the address conflict even in the case where the contracted address CAD is expressed by the key address KEY and the mask vector MSK.

Figure 10:
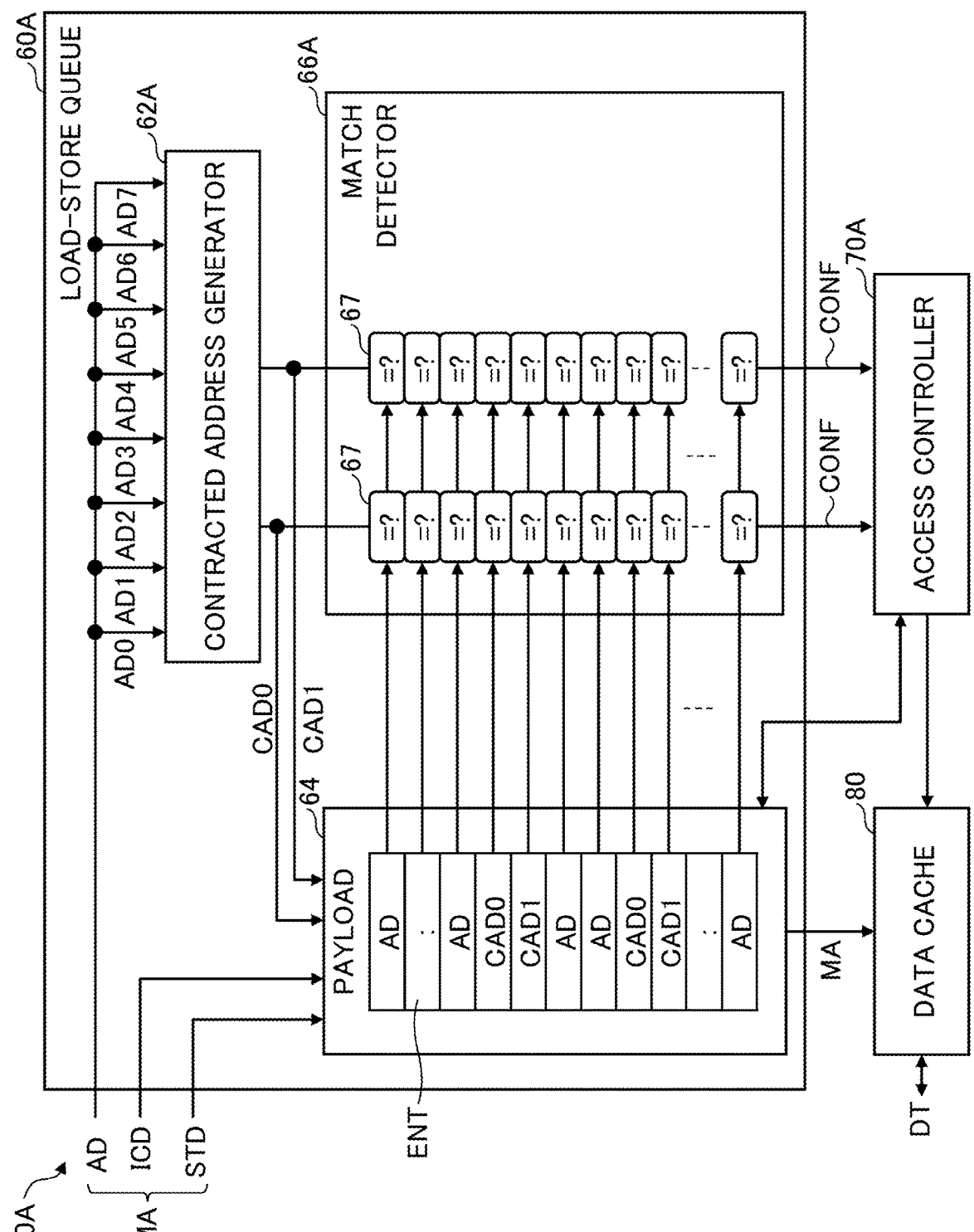
FIG. 10 is a block diagram illustrating an example of a part of the processor according to a third embodiment.

FIG. 10 illustrates an example of a part of the processor according to a third embodiment. A detailed description of elements illustrated in FIG. 10 that are similar to the elements of the embodiments described above will be omitted. A processor 100A illustrated in FIG. 10 includes a load-store queue 60A, an access controller 70A, and the L1 data cache 80. The load-store queue 60A includes a contracted address generator 62A, a payload 64, and a match detector 66A. The match detector 66A is an example of the conflict detector.

The contracted address generator 62A groups the multiple addresses AD (AD0 through AD7) included in the memory access instruction MA (the load instruction or the store instruction) into address groups, and generates contracted addresses CAD0 and CAD1 for each of the address groups. The contracted addresses CAD0 and CAD1 are output to the match detector 66A, and stored in the payload 64.

By generating the contracted addresses CAD0 and CAD1 for each of the address groups, it is possible to narrow the range of the address AD indicated by each of the contracted addresses CAD0 and CAD1, compared to the case where a single contracted address CAD is generated without grouping the multiple addresses AD. For this reason, it is possible to reduce the number of addresses AD included in each of the contracted addresses CAD0 and CAD1, and to improve the accuracy of detecting the conflict.

The match detector 66A includes multiple match detection circuits 67 respectively corresponding the entries ENT of the payload 64, for each of the contracted addresses CAD0 and CAD1. Each of the match detection circuits 67 has the same configuration and function as the match detection circuit 67 illustrated in FIG. 9. Similar to the match detection circuit 6 illustrated in FIG. 1, the match detection circuit 67 illustrated in FIG. 10 compares the address held by the corresponding entry ENT of the payload 64 with the corresponding contracted address CAD0 or CAD1. Further, the match detection circuit 67 outputs the conflict signal CONF according to the comparison result to the access controller 70A.

The access controller 70A controls the processes of the memory access instruction held in the payload 64, and controls the access to the L1 data cache 80, based on multiple conflict signals CONF for each of the contracted addresses CAD0 and CAD1.

As described above, this embodiment can also obtain effects similar to the effects obtainable by embodiments described above. For example, the match detector 66A compares the contracted address CAD with the address held in the payload 64. For this reason, it is possible to reduce the number of match detection circuits 67, and to reduce the circuit scale of the match detector 66A, compared to the case where the multiple addresses AD before the contracting are used for the comparison. In addition, the contracted address generator 62A stores the generated multiple contracted addresses CAD0 and CAD1 in the payload 64. For this reason, it is possible to increase the number of memory access instructions storable in the payload 64, compared to the case where the multiple addresses AD before the contracting are stored in the payload 64. As a result, it possible to improve the processing performance of the processor 100A.

Further, in this embodiment, the contracted address generator 62A generates the multiple contracted addresses CAD0 and CAD1. For this reason, the range of the address AD indicated by each of the contracted addresses CAD0 and CAD1 can be narrowed, compared to the case where a single contracted address CAD is generated. Accordingly, it is possible to reduce the number of addresses AD included in each of the contracted addresses CAD0 and CAD1, and to improve the accuracy of detecting the conflict. As a result, in a case where a conflict of addresses AD of a load instruction LD actually does not occur, for example, it is possible to reduce a frequency of detecting the conflict of the load instruction LD and a preceding store instruction ST and canceling the load instruction LD, and to reduce a deterioration in the processing performance of the processor 100A.

Figure 11:
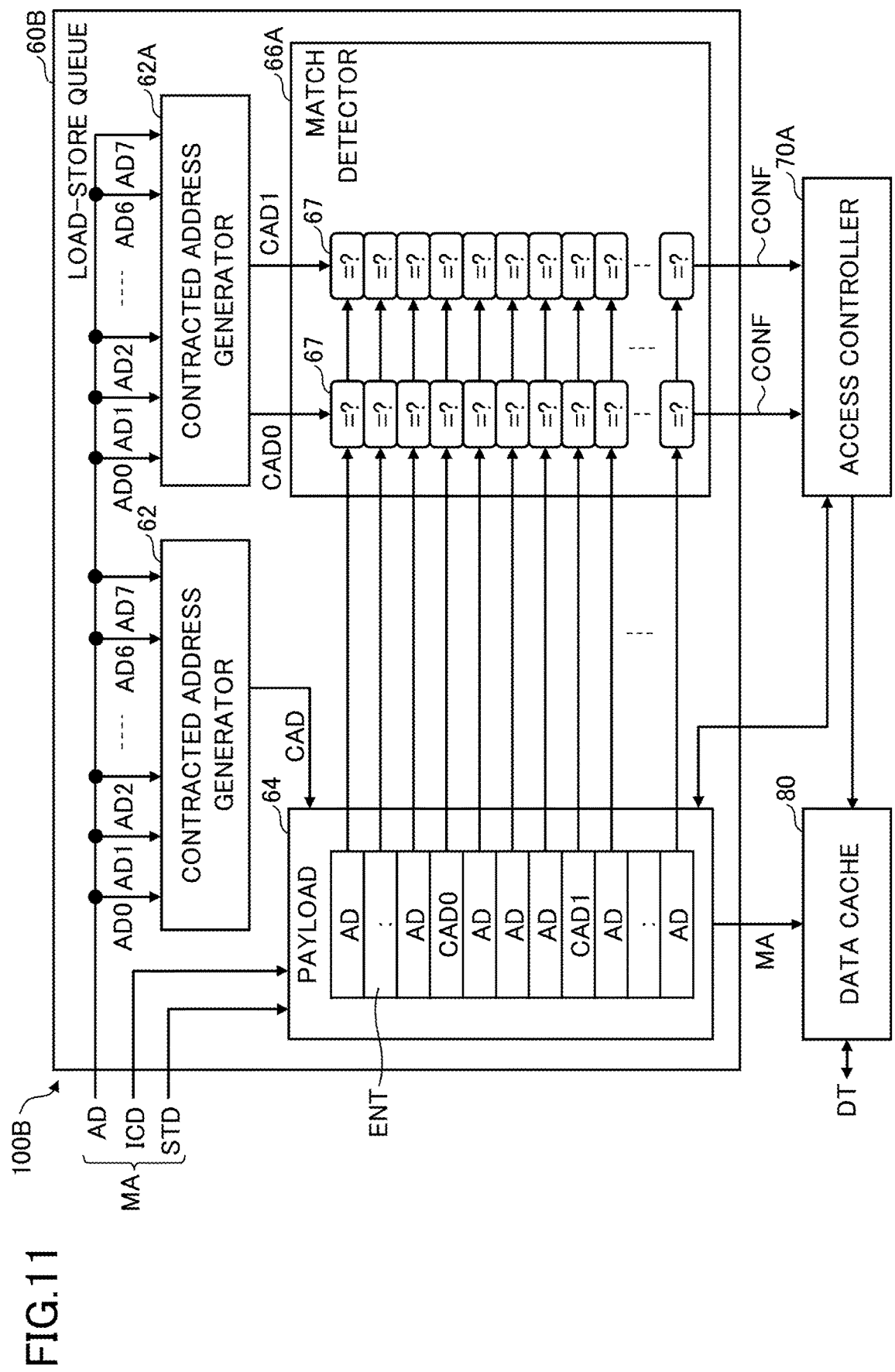
FIG. 11 is a block diagram illustrating an example of a part of the processor according to a fourth embodiment.

FIG. 11 illustrates an example of a part of the processor according to a fourth embodiment. A detailed description of elements illustrated in FIG. 11 that are similar to the elements of the embodiments described above will be omitted. A processor 100B illustrated in FIG. 11 has the same configuration as the processor 100A illustrated in FIG. 10, except that a load-store queue 60B is provided in place of the load-store queue 60A.

The load-store queue 60B additionally includes the contracted address generator 62, in the load-store queue 60A illustrated in FIG. 10. The contracted address generator 62 has the same configuration and function as the contracted address generator 62 illustrated in FIG. 8. That is, the contracted address generator 62 contracts the multiple addresses AD (AD0 through AD7) included in the memory access instruction MA (the load instruction or the store instruction), and generates the contracted address CAD. The contracted address generator 62 illustrated in FIG. 11 is an example of a first contracted address generator, and the contracted address CAD generated by the contracted address generator 62 is an example of a first contracted address. The contracted address generator 62A is an example of a second contracted address generator, and the contracted addresses CAD0 and CAD1 generated by the contracted address generator 62A are examples of a second contracted address.

The contracted address CAD generated by the contracted address generator 62 is stored in the payload 64. Accordingly, in this embodiment, it is possible to reduce the number of contracted addresses CAD stored in the payload 64, compared to the number of contracted addresses CAD0 and CAD1 stored in the payload 64 illustrated in FIG. 10. As a result, because the number of addresses AD stored in the payload 64 relatively increases, it is possible to increase the number of memory access instructions stored in the payload 64, and to improve the processing performance of the processor 100B.

As described above, this embodiment can also obtain effects similar to the effects obtainable by embodiment described above. Further, in this embodiment, the contracted address CAD is stored in the payload 64, and the contracted addresses CAD0 and CAD1 are output to the match detector 66A. Accordingly, it is possible to increase the number of addresses AD stored in the payload 64, compared to the case where the contracted addresses CAD0 and CAD1 are stored in the payload 64, while improving the accuracy of detecting the conflict by the match detector 66A. As a result, it is possible to improve the processing performance of the processor 100B.

In the example described above, the contracted address CAD generated by the contracted address generator 62 becomes a single contracted address. However, the contracted address generator 62 may generate a multiple number of contracted addresses different from the number of contracted addresses generated by the contracted address generator 62A, or multiple contracted addresses for each of multiple groups that are grouped according to different grouping methods. In addition, although two contracted addresses are generated by the contracted address generator 62A in the example described above, three or more contracted addresses may be generated.

Figure 12:
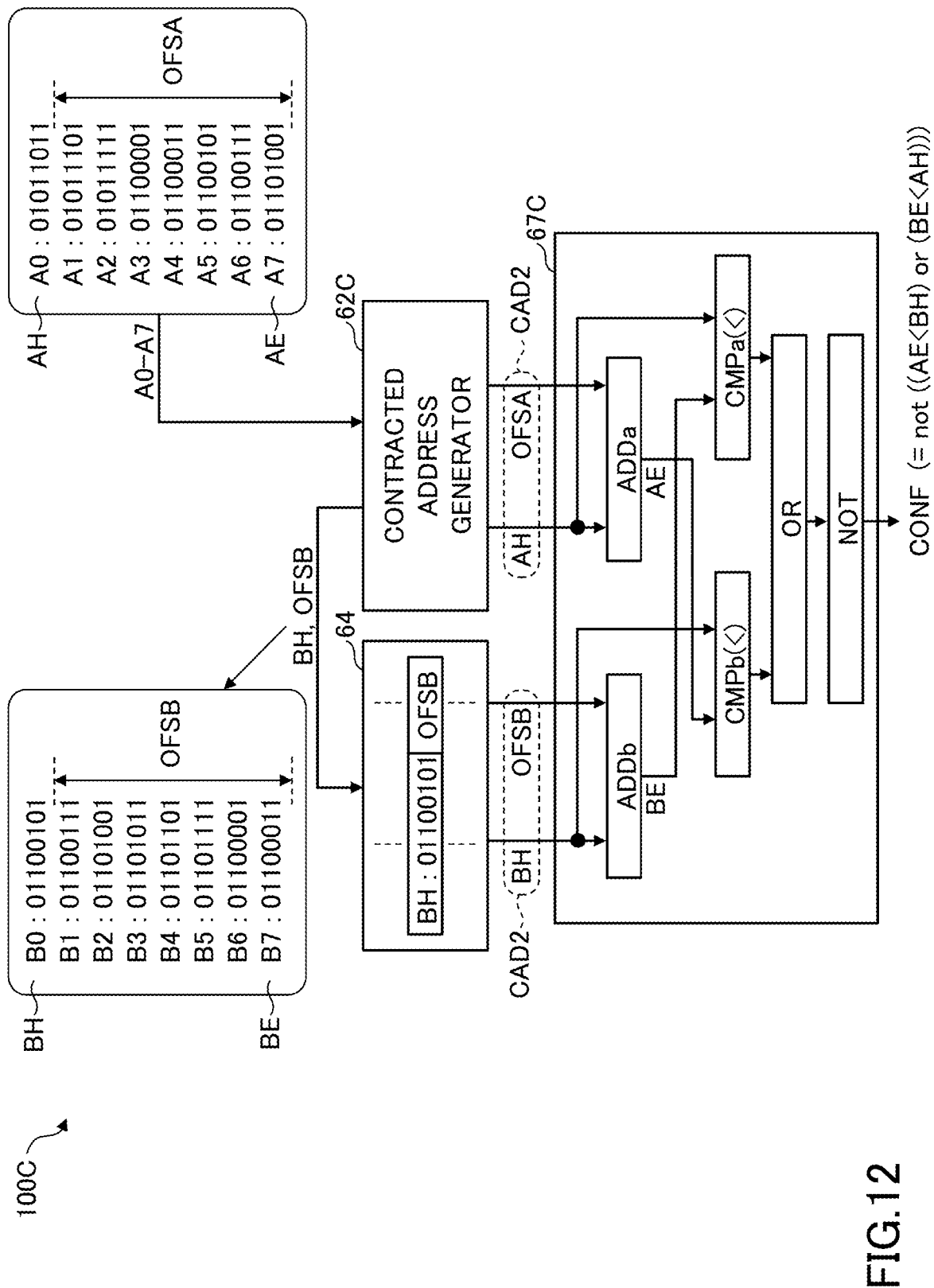
FIG. 12 is a block diagram illustrating an example of a part of the processor according to a fifth embodiment.

FIG. 12 illustrates an example of a part of the processor according to a fifth embodiment. A detailed description of elements illustrated in FIG. 12 that are similar to the elements of the embodiments described above will be omitted. A processor 100C illustrated in FIG. 12 additionally includes a contracted address generator 62C and a match detection circuit 67C, in the processor 100 illustrated in FIG. 7, or in the processor 100A illustrated in FIG. 10, or in the processor 100B illustrated in FIG. 11. Although one match detection circuit 67C is illustrated in FIG. 12, the match detection circuit 67C in actual practice is provided for each entry ENT (not illustrated) included in the payload 64. Further, a match detector including multiple match detection circuits 67, and multiple match detection circuits 67C, is provided. The match detection circuit 67C is an example of the conflict detection circuit.

The contracted address generator 62C generates a contracted address CAD2 indicating a range of multiple addresses AD included in the memory access instruction. The contracted address CAD2 generated by the contracted address generator 62C is an example of a fourth contracted address. For example, the contracted address generator 62C generates a starting address AH (=A0), and an offset OFSA corresponding to a distance from the starting address AH to an ending address AE, as the contracted address CAD2. The contracted address generator 62C stores the generated contracted address CAD2 in the payload 64.

For example, information indicating the memory access instruction MA, and the contracted address CAD2, including a starting address BH and an offset OFSB, generated in the past by the contracted address generator 62C, are stored in the entry ENT (not illustrated) of the payload 64. That is, the contracted address CAD2, or the contracted address CAD generated by the contracted address generator 62 illustrated in FIG. 7, is stored in each entry ENT of the payload 64. In the case where the memory access instruction MA includes the single address AD, the single address AD is set as the starting address AH (or BH), and the offset OFSA (or OFSB) is set to "0", according to a contracting rule.

The match detection circuit 67C includes adders ADDa and ADDb, comparators CMPa and CMPb, an OR-circuit OR, and an inverter circuit NOT. The adder ADDa calculates the ending address AE, by adding the starting address AH and the offset OFSA output from the contracted address generator 62C. The adder ADDb calculates an ending address BE, by adding the starting address BH and the offset OFSB output from the corresponding entry ENT of the payload 64.

The comparator CMPa compares the ending address BE with the starting address AH, to determine a size relationship therebetween. For example, the comparator CMPa outputs "1" when the ending address BE is smaller than the starting address AH, and outputs "0" when the ending address BE is larger than or equal to the starting address AH. The comparator CMPb compares the starting address BH with the end address AE, to determine a size relationship therebetween. For example, the comparator CMPb outputs "1" when the ending address AE is smaller than the starting address BH, and outputs "0" when the ending address AE is larger than or equal to the starting address BH.

The OR-circuit OR outputs a logical sum of outputs of the comparators CMPa and CMPb to the inverter circuit NOT. The inverter circuit NOT inverts a logic value output from the OR-circuit OR, and outputs the inverted logic value as the conflict signal CONF. Accordingly, the logic of the conflict signal CONF can be expressed by the following formula (1).

$$\text{CONF}=\text{"not } ((AE<BH) \text{ or } (BE<AH)) \quad (1)$$

The contracted address generator 62C may generate the starting address AH and the ending address AE as the contracted address CAD2. In this case, although the number of bits of the contracted address CAD2 increases, the match detection circuit 67C does not require the adders ADDa and ADDb. By generating the contracted address CAD2 indicating the range of the multiple addresses AD included in the memory access instruction, it is possible to improve the accuracy of detecting the conflict, compared to the case where the contracted address CAD is generated using the ternary logic.

FIG. 13 illustrates an example of an operation of the match detection circuit 67C illustrated in FIG. 12. The match detector of this embodiment includes the match detection circuit 67 illustrated in FIG. 9, and the match detection circuit 67C illustrated in FIG. 12. As illustrated in FIG. 13, the conflict signal CONF is set to "0" when the range of the contracted address CAD2 indicated by the starting address AH and the offset OFSA does not overlap the range of the contracted address CAD2 indicated by the starting address BH and the offset OFSB. The conflict signal CONF is set to "1" when the range of the contracted address CAD2 indicated by the starting address AH and the offset OFSA overlaps the range of the contracted address CAD2 indicated by the starting address BH and the offset OFSB.

In the processor 100C illustrated in FIG. 12, the contracted address CAD represented by the ternary logic, and the contracted address CAD2 indicating the range of the address AD, are generated from the multiple addresses AD included in the memory access instruction MA. For example, the contracted address generator 62 illustrated in FIG. 7 contracts the bits of the multiple addresses AD to generate the contracted address CAD. The contracted address CAD may be generated by the contracted address generator 62A illustrated in FIG. 10 or FIG. 11. The contracted address CAD generated by the contracted address generator 62 or 62A is an example of a third contracted address. Further, the contracted address generator 62C illustrated in FIG. 12 generates the contracted address CAD2 indicating the range of the multiple addresses AD.

It is difficult to convert the multiple addresses AD, that do not vary in the ascending order or the descending order, into the contracted address CAD2 as they are. For this reason, similar to the contracted address generator 62, the contracted address generator 62C first generates the contracted address CAD expressed by the ternary logic of "0", "1", and "X". Next, the contracted address generator 62C generates a minimum value of the address AD by regarding that the indefinite value "X" of the generated contracted address CAD is "0", and generates a maximum value of the address AD by regarding that the indefinite value "X" of the generated contracted address CAD is "1". In addition, the contracted address generator 62C generates the contracted address CAD2 including the starting address AH and the offset OFSA. The contracted address generator 62C may generate the minimum value and the maximum value of the address AD, by replacing the indefinite value "X" of the contracted address CAD generated by the contracted address generator 62 with "0" and "1".

In the case where the multiple addresses AD do not vary in the ascending order or the descending order, the load-store queue, including the contracted address generator 62 and the contracted address generator 62C, stores the contracted address CAD generated by the contracted address generator 62 in the payload 64. In the case where the multiple addresses AD vary in the ascending order or the descending order, the load-store queue stores the contracted address CAD2 generated by the contracted address generator 62C in the payload 64.

In a case where the contracted address CAD is held in the entry of the payload 64, the match detector including the match detection circuits 67 and 67C detects a conflict between the held contracted address CAD and the contracted address CAD generated by the contracted address generator 62. In a case where the contracted address CAD2 is held in the entry of the payload 64, the match detector including the match detection circuits 67 and 67C detects a conflict between the held contracted address CAD2 and the contracted address CAD2 generated by the contracted address generator 62C.

As described above, in the case where the addresses AD included in the memory access instruction MA are not in the ascending order or the descending order, the conflict of the addresses AD is detected using the contracted address CAD generated by the contracted address generator 62. In the case where the addresses AD included in the memory access instruction MA are in the ascending order or the descending order, the conflict of the addresses AD is detected using the contracted address CAD2 generated by the contracted address generator 62C.

Examples of the memory access instruction MA including the addresses AD that are not in the ascending order or the descending order include the gather instruction, the scatter instruction, or the like, for example. Further, examples of the memory access instruction MA including the addresses AD that are in the ascending order or the descending order include the stride access instruction or the like, such as the contiguous address load instruction LD, the contiguous address vector store instruction ST, or the like, for example.

As described above, this embodiment can also obtain effects similar to the effects obtainable by embodiment described above. Further, in this embodiment, in the case where the addresses AD included in the memory access instruction MA are in the ascending order or the descending order, the conflict of the addresses AD is detected using the contracted address CAD2, thereby making it possible to improve the accuracy of detecting the conflict.

According to the embodiments, it is possible to reduce a circuit scale of a conflict detector that detects a conflict between an address included in a memory access instruction and an address held in a queue that holds the memory access instruction.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," "second," "third," "fourth," or "fifth," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processor comprising:
    a queue configured to hold a memory access instruction including one or more addresses;
    a contracted address generator configured to generate a contracted address by contracting bits of multiple addresses in a case where the memory access instruction includes the multiple addresses;
    a conflict detector configured to detect a conflict between the multiple addresses and the address held in the queue by comparing the contracted address and the address held in the queue; and
    an access controller configured to control processes of the memory access instruction held in the queue, based on a detection result of the conflict detector,
    wherein the contracted address generator stores the generated contracted address in the queue, and
    wherein the contracted address generator generates the contracted address represented by a ternary logic in which all bit values are "0", "1", or an indefinite value at each of bit positions of the multiple addresses.

2. The processor as claimed in claim 1, wherein the contracted address generator generates the contracted address by contracting the one or more addresses included in the memory access instruction according to a contracting rule.

3. The processor as claimed in claim 1, wherein the contracted address generator groups the multiple addresses included in the memory access instruction into multiple address groups, and generates a contracted address for each of the multiple address groups, and the conflict detector detects a conflict between the contracted address of each of the multiple address groups and the address held in the queue.

4. The processor as claimed in claim 3, wherein the contracted address generator includes
    a first contracted address generator configured to contract the bits of the multiple addresses for each of multiple groups that are grouped according to different grouping methods or different number of the multiple address groups, and
    a second contracted address generator configured to contract the bits of the multiple addresses for each of the multiple address groups,
    a first contracted address generated by the first contracted address generator is stored in the queue, and
    a second contracted address generated by the second contracted address generator is output to the conflict detector.

5. The processor as claimed in claim 1, wherein the contracted address generator generates a contracted address indicating a range of the multiple addresses included in the memory access instruction, and the conflict detector detects a conflict between an address included in the range indicated by the contracted address and the address held in the queue.

6. The processor as claimed in claim 5, wherein the contracted address generator
    generates a third contracted address in which the bits of the multiple addresses are contracted, and a fourth contracted address indicating the range of multiple addresses, and
    holds one or both of the generated third contracted address and fourth contracted address in the queue, and
    the conflict detector
    detects a conflict between the third contracted address held in the queue and the third contracted address generated by the contracted address generator in a case where the third contracted address is held in the queue, and
    detects a conflict between the fourth contracted address held in the queue and the fourth contracted address generated by the contracted address generator in a case where the fourth contracted address is held in the queue.

7. The processor as claimed in claim 1, wherein the contracted address generator generates the contracted address by setting bits lower than the bit position indicating the indefinite value in the contracted address to an indefinite value.

8. The processor as claimed in claim 1, wherein the contracted address generator generates a key address indicating one of the multiple addresses, and a mask vector expressed by an exclusive-OR of bit values of each of the bit positions of the multiple addresses, as the contracted address.

9. The processor as claimed in claim 8, wherein
    the conflict detector includes multiple conflict detection circuits configured to detect conflicts between the contracted address and the multiple addresses held in the queue, respectively, and
    each of the multiple conflict detection circuits includes
        an exclusive-NOR circuit configured to calculate an exclusive-NOR of bits of key addresses included in the contracted address and the contracted address held in the queue, a first OR-circuit configured to calculate a logical sum of bits of mask vectors included in the contracted address and the contracted address held in the queue, a second OR-circuit configured to calculate a logical sum of bits of an output of the exclusive-NOR circuit and an output of the first OR-circuit, and an AND-circuit configured to calculate a logical product of all bits of an output of the second OR-circuit, and an address conflict is detected when an output of the AND-circuit is "1".

10. A processing method to be implemented in a processor having a queue that holds a memory access instruction including one or more addresses, the processing method comprising:

generate, by a contracted address generator of the processor, a contracted address by contracting bits of multiple addresses in a case where a memory access instruction includes the multiple addresses;

detecting, by a conflict detector of the processor, a conflict between the multiple addresses and the address held in the queue by comparing the contracted address and the address held in the queue; and controlling, by an access controller of the processor, processes of the memory access instruction held in the queue, based on a detection result by the conflict detector, wherein the contracted address generator stores the generated contracted address in the queue. and wherein the contracted address generator generates the contracted address represented by a ternary logic in which all bit values are "0", "1", or an indefinite value at each of bit positions of the multiple addresses.

* * * * *